United States Patent [19]
Limberger

[11] 3,799,305
[45] Mar. 26, 1974

[54] DEVICE FOR CONTROLLING ONE OR MORE PROCESSES

[75] Inventor: Walter Limberger, Hamburg-Poppenbuttel, Germany

[73] Assignee: Lumoprint Zindler KG, Hamburg, Germany

[22] Filed: Mar. 17, 1972

[21] Appl. No.: 235,679

[30] Foreign Application Priority Data
Mar. 18, 1971 Germany............................ 2113075

[52] U.S. Cl..................... 192/33, 74/125.5, 192/16, 192/148
[51] Int. Cl....................... F16d 71/00, F16d 67/06
[58] Field of Search ................ 192/33, 148, 15, 16; 74/125.5

[56] References Cited
UNITED STATES PATENTS

| | | | |
|---|---|---|---|
| 1,153,831 | 9/1915 | Slentz............................. | 192/33 R |
| 2,742,125 | 4/1956 | Borchardt..................... | 192/33 R X |
| 2,430,444 | 11/1947 | Bemis............................... | 192/33 R |
| 2,711,237 | 6/1955 | Wylie............................... | 192/33 R |
| 792,831 | 6/1905 | Kirpatrick....................... | 192/33 R |

*Primary Examiner*—Allan D. Herrmann
*Attorney, Agent, or Firm*—Toren and McGeady

[57] ABSTRACT

An improved device for controlling one or several processes or process steps as a function of a trigger pulse, comprising a continuously revolving shaft with a disk-shaped drive element, wherein the pulse causes a control disk to be coupled for a certain arc of the rotation, and wherein the said control disk is mounted on a shaft parallel to the drive shaft, wherein the improved device is adapted to provide with small forces and travels non-positive and non-slip connections with a drive mechanism for transmitting large forces. This device has a mechanical construction, operates reliably and is of simple design. Certain control functions are achieved either by dimensioning the angle of rotation or by a positive engagement.

11 Claims, 5 Drawing Figures

DEVICE FOR CONTROLLING ONE OR MORE PROCESSES

DESCRIPTION OF THE PRIOR ART

In a known construction of this kind, the shaft for the control disk is laterally offset relative to the disk-shaped drive element. The control disk is provided with a recess in its periphery in which the disk-shaped drive element can freely revolve, whilst it makes contact with a circumference of the control disk if the same is rotated so far that the circumferential recess is no longer in alignment with the drive element. This movement may be produced, for example, by a spring acting on a crank or eccentrically.

It has already been proposed to combine the features outlined above with intermediate members which cause the control disk to make one or several revolutions. Also in this case, a circumferential engagement is made which is generally produced by a friction lining mounted on the periphery. However, parallel shafts for the disk-shaped drive element and for the control disk are always provided, wherein the term parallel is intended to include in the known constructions a laterally offset arrangement, but according to the invention also a coaxial arrangement.

In the known devices, the transmission of a force is effected by friction, and this may bring about certain disadvantages, for example slipping. In the known or already proposed devices, toothed engagement requires a substantial play unless the possibility of jamming is to be accepted. Furthermore, the action of the spring making the engagement and actuating the control disk cannot be exactly defined, because the spring constants may vary and the circumferential recess may have intentionally different dimensions, on the one hand in order to avoid as far as possible the jamming hereinbefore mentioned, and on the other hand to prevent an over-run.

SUMMARY OF THE INVENTION

It is an object of the invention to provide a device capable of forming a drive mechanism for transmitting large forces in which non-positive and non-slip connections may be made with small forces and with small travels. This device should be mechanically constructed, operare reliably and have a simple design with few parts. Furthermore, certain control functions should be possible either by means of dimensioning the angle of rotation or for the duration of a potentially indirectly controlled but directly made operating engagement.

It is a further object of the invention to provide a device of the kind hereinbefore mentioned in which the control disk is mounted axially movably on the shaft of the disk-shaped drive element, and both the control disk and the disk-shaped drive element have rings of claws or dogs facing each other in the axial direction, wherein the control disk has at least one profile for a stop member which disengages when the axially movable control disk makes engagement with the drive element. The coaxial arrangement of the disk-shaped drive element and of the control disk produces a structural combination which results in substantially smaller dimensions than hitherto known constructions. The claw rings, and more particularly toothed rings, ensure a non-slip engagement, wherein the axial travel has only the length necessary to produce the engagement and disengagement of the toothed rings, so that the travels and forces required are only small.

The said stop member has the particular advantage that, after a single disengagement under the action of a control pulse it is automatically brought back into engagement by spring elements acting thereon, after a certain angle of rotation which is predetermined by the arrangement of the profiles.

It is a further object of the invention to provide a device of the kind hereinbefore mentioned, comprising a pivoting lever for the axial displacement of the control disk, which is connected with an actuator, and more particularly an actuating magnet, associated with a counter-spring. In this manner, particularly favourable transmission of movements may be achieved on a minimum space. It is possible to provide one or several stop members along the circumference of the control disk with a view to providing different angles of rotation by means of the control disk with a pulse-like movement of the disk. It should be noted that the control disk is in turn connected drivingly with a control device which may in turn deliver control pulses, thereby making possible great versatility of controls.

The stop members may have the profiles of holes or they may be sloping or step-like in the direction of the circumference of the control disk.

In a particularly preferred embodiment, a further disk is mounted on a further shaft parallel to the main shaft and meshes with the circumference of the control disk, wherein this disk is associated with at least one profile which controls by means of the dog clutch the duration of the connection between a take-off device and the drive shaft. This makes possible a superimposed control, so that a single trigger pulse may switch the drive on or off.

The said several stop members may also be replaced by a single stop member which is adjustable about the circumference of the control disk, making it possible to adapt the device to different control conditions.

It is a further object of the invention to provide a device of the type hereinbefore mentioned in which the said at least one profile on the further disk is associated with a counter-profile on the pivoting lever. In this manner, certain steps of movement may be adjusted by moving the pivoting lever and by means of the drive of the said further disk, wherein the pivoting lever acts both on the control disk and on the said further disk by means of a stop member.

In a particularly preferred embodiment the control disk has a profile adapted to receive a stationary pin and the said further disk has a corresponding profile for a pin mounted on the pivoting lever, wherein coincidence between the profiles and the engaging elements occurs only after a selected predetermined number of revolutions of the control disk in accordance with the transmission ratio between the control disk and the said further disk. Taking into consideration a transmission between the control disk and the said further disk, it follows that the profiles can be so associated that a common interlocking of the control disk and the further disk occurs only after the said predetermined number of revolutions has been performed. This common interlocking enables the control lever and more particularly the pivoting lever to permit the return movement of the control disk under the action of a spring, whilst simultaneously locking the said further disk. It follows therefrom that the invention provides a mechanical control which controls certain angles of rotation of a shaft, wherein these angles may exceed 360° by any amount or may be smaller.

It is a further object of the invention to provide a device of the kind hereinbefore described in which the profile of the said further disk is a hub ring with axially offset circumferential sections into which engages a switching lever which causes a potentially indirect engagement between the disk-shaped drive elements and a driven disk. This makes it possible to control the duration of engagement of the driven disk. Preferably, the circumferential sections, and the profile of the control disk, co-operating with the stop member, are offset relative to their circumferential sections in such a way that the connection of the control disk to the drive member causes a driven disk to be connected to, or disconnected from, the drive member. In this construction, the disk-shaped drive element is preferably in positive engagement with a drive wheel mounted on a motor shaft, and the driven disk is mounted axially displaceably on an extension of the motor shaft; mutually facing claw rings on the drive wheel and on the driven disk may be selectively engaged or disengaged by the pivoting switching lever. In this manner, the driven disk may be brought into direct engagement with the drive wheel or a drive element by an axial movement, i.e. perpendicularly to the driving movement; This produces on the one hand a very high degree of accuracy of control, whilst requiring on the other hand small servo forces for making or disconnecting the engagement.

Preferably, the control disk, the said further disk, as well as the disk-shaped drive element and the drive wheel are constructed as gears which are in permanent engagement.

BRIEF DESCRIPTION OF THE DRAWINGS

The invention will be further described by way of example, with reference to embodiments shown in the accompanying drawings. Further details will also become apparent from the appended claims. In the drawings:

DESCRIPTION OF THE PREFERRED EMBODIMENTS

Figure 1:
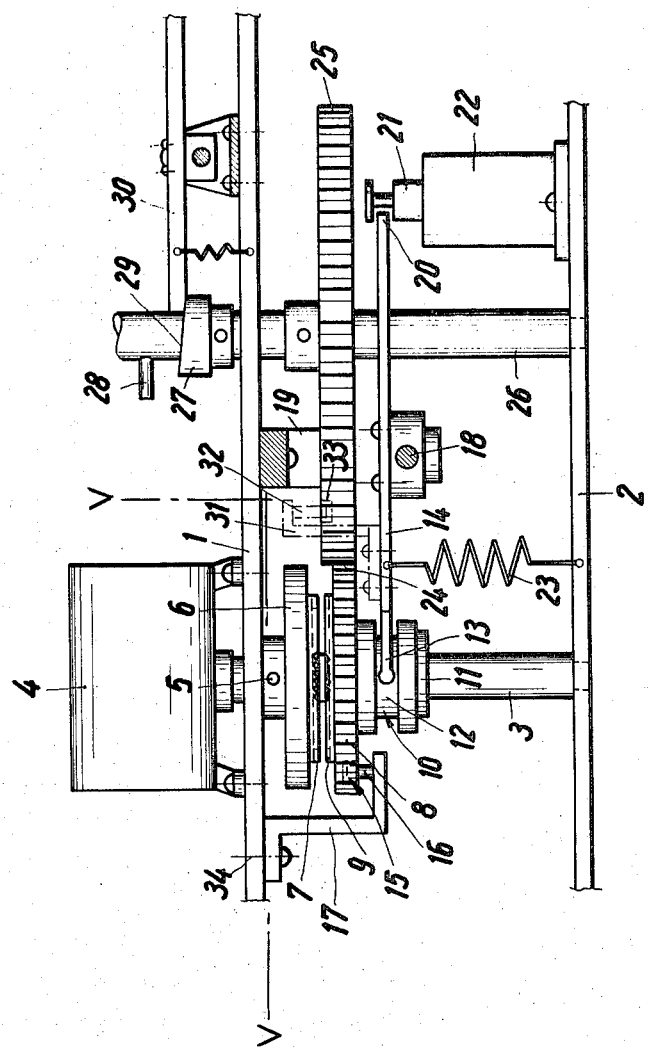
FIG. 1 is a partially sectionalized diagrammatic view of a first embodiment of the invention.

Referring now to FIG. 1 of the drawing, there are shown two plates 1, 2 which may be mounted on a base plate parallel to the plane of the drawing in a device which is to be controlled. These two plates are shown in order to demonstrate that two such mounting elements are sufficient for purposes of the invention, wherein these two plates may be even closer together than is shown in the drawing.

A shaft 3 is mounted in the two plates, and is continuously driven by a drive motor 4. The motor 4 is mounted on the plate 1.

A disk-shaped drive element 6, having the form of a gear is mounted non-rotatably and axially nondisplaceably on the shaft 3, for example by means of a cotter pin 5; the gear 6 has a ring of claws 7 in the axial direction. This ring may be formed, for example, by a rack bent concentrically around the shaft 3.

The shaft 3 carries also an axially displaceable and freely rotatable control disc 8, having on its surface facing the disk-shaped drive element 6 a ring of claws 9 corresponding to the ring 7. Both rings of claws are adapted to make engagement to produce a non-positive drive.

In the drawing, the control disk 8 is in the disengaged position in which its hub 10 rests on a stop ring 11 of the shaft 3. The hub 10 has a groove-shaped circumferential recess 12 which engages into a control pin 13 of a pivoting lever 14.

Furthermore, on its side remote from the drive element 6, the control disk 8 has a profile 15, co-operating with a pin 16 which acts as stop element and is mounted on a carrier 17 fixed to the plate 1. The depth of engagement between the profile 15 and the stop element 16 is such that the element 16 is out of engagement when the rings of claws 7 and 9 are in driving engagement. Several profiles 15 or stop elements 16 may be arranged distributed over the circumference. More particularly, the carrier a 17 with the pins 16 may be arranged displaceably in the direction of the circumference of the control disk 8.

The pivoting lever 14 is adapted to pivot about a pivot pin 18 which is perpendicular to the axis of the shaft 3 and is mounted on a block 19 fixed to the plate 1. One end 13 of the pivoting lever 14 may engage with an angled pin into the circumferential groove 12, whilst the other, equally forked end 20 is connected to the armature 21 of an actuating magnet 22 mounted on the plate 2. The drawing shows merely a possible embodiment. Obviously, the body of the magnet 22 may be arranged on the side of the plate 2 remote from the plate 1, thereby making it possible to bring the two plates nearer together.

A tension spring 23 acts on the pivoting lever 14 between its working end 13 and the pivot 18, and tends to pull the control disk 8 and its hub 10 towards the stop ring 12, i.e., into a position in which the rings of claws 7, 9 are out of engagement. Although the lever 14 has been described as a pivoting lever, it is obvious that in another construction a translatory movement would be possible, which would necessitate different mounting means on the block 19.

The device described so far shows a construction in which a pulse derived from the actuating magnet 22 produces the engagement between the rings of claws 7 and 9, and this engagement is maintained during a revolution of the control disk 8 until the pin 16 running on the downward facing side re-enters into the profile 15. The pin 16 may be provided at its free end with means reducing the friction, for example with a roller. Furthermore profiles 15 may be distributed at any angles along the periphery of the control disk 8, so that certain angles of rotation of the control disk will be controlled with every pulse in a slip-free manner.

In a particularly preferred construction, the control disk 8 has an external toothing 24 and meshes with a further disk and preferably with a gear 25. Obviously, this engagement might also be achieved by profiled rims. However, toothed engagement provides a non-slip driving connection and is, therefore, to be preferred. The said further disk or gear 25 is mounted on a shaft 26 located in the plates 1 and 2. The thickness of this further disk 25 in the axial direction is such that the engagement of the control disk 8 is maintained in any position within the axial range of movement. Obviously, the said further disk 25 is driven in accordance with the rotary drive of the control disk 8 and the transmission between the control disk 8 and the further disk 25 may be used for dimensioning or timing any control process, for example by means of a cam 27 on the shaft 26, or a stop element 28 on the shaft 26. Such a cam may have a profiled cam face 29 which collaborates with a control lever 30, adapted to pivot according to the profile, whilst the stop 28 may engage into a profiled groove. The gear 25 is mounted non-rotatably, but axially displaceably on the shaft 26.

In the combination comprising the control disk 8 and the said further disk 25, it is of particular advantage that the pivoting lever 14 adapted to move the control disk 8, has a carrier 31 for a pin 32 which co-operates with at least one profile notch 33 on the said further disk 25 in such a manner that the engagement is made when the control disk 8 is in the position shown in the drawing in which also the pin 16 engages into the profile 15. The engagement is released when the pin 16 slides on the periphery of the control disk 8 outside the profile 15, i.e. when the magnet 22 has moved the pivoting lever 14 in a corresponding manner, whereby also the end of the pin 32 reaches the side of the said further disk 25, shown on top in the drawing. It may be seen that the depth of penetration of the pin 32 into the profile 33 is so dimensioned with regard to the arm of the pivoting lever 14 that these conditions are observed.

It is possible to provide that the said further disk 25 should make one revolution for fifteen or any other number of revolutions of the control disk 8. Naturally, the transmission between the control disk 8 and the said further disk 25 must then be 1:15 or any other desired ratio. Under these conditions, when the rings of claws 7 and 9 make engagement following a pulse, the ends of pins 16, 32 slide on the corresponding side surfaces of the control disk 8 and the further disk 25. It may be seen that after one rotation of the control disk 8 the pin 16 cannot enter into the notch 15 because the pin 32 retains the pivoting lever 14 in the position in which the hub 10 rests on the stop ring 11. Coincidence occurs only after fifteen revolutions of the control disk 8, enabling both pins 16 and 32 to engage into their corresponding notches 15 and 33. Thus, it is possible to achieve with one pulse on the magnet 22 that the said further disk 25 revolves once completely, or through an angle determined by the arrangement of the profiles, whilst during the rotation the non-positive engagement between the rings of claws 7 and 9 is ensured. This provides a mechanical timing element with very accurate operation which runs synchronously with the motor 4 or other drive elements. A particularly preferred application is in the field of copying apparatus.

The pivoting lever 14 has an accurately defined position. In order to permit the control to be modified, the carrier 17 or its mounting 34 on the plate 1 is adapted in a particular embodiment to be moved and fixed along an arc of a circle extending about the shaft 3. By way of example, the fixing elements may be screws 34, 34' securing carriers 17, 17', respectively, into certain ones of tapped holes 80, 81 formed on an arc of a circle in the plate 1.

Figure 2:
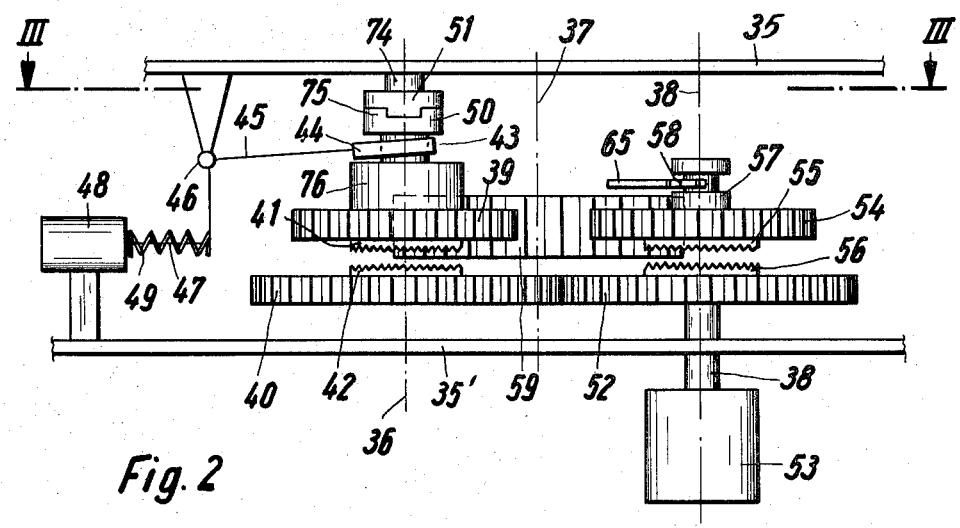
FIG. 2 is a plan view of a further embodiment of the invention in cross-section along the line II—II in FIG. 3, showing diagrammatically only the essential parts of the invention.
Figure 3:
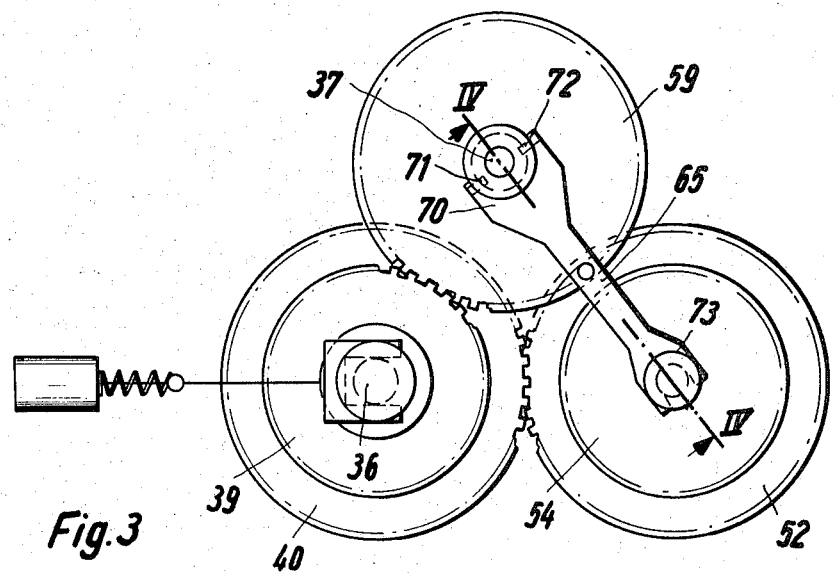
FIG. 3 shows the device of FIG. 2 in cross-section along the line III—III in FIG. 2.
Figure 4:
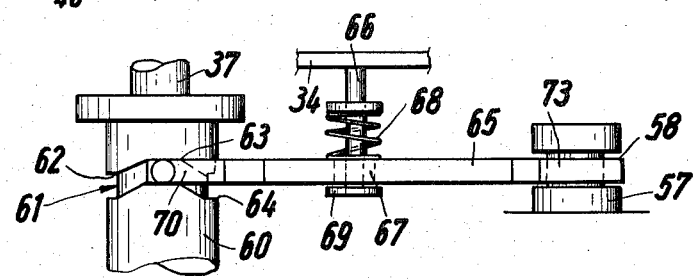
FIG. 4 shows on an enlarged scale in cross-section along the line IV—IV in FIG. 3 the arrangement of the switching lever with the points of engagement.
Figure 5:
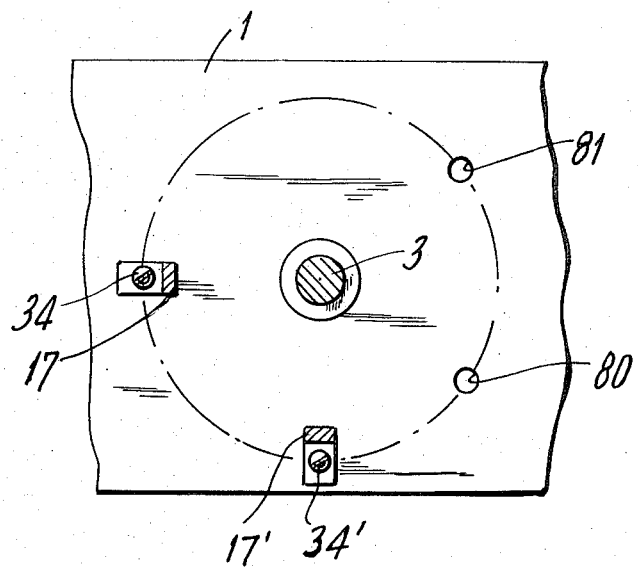
FIG. 5 is a view taken along line V—V in FIG. 1.

Whilst the device according to FIG. 1 shows an arrangement whereby a certain angle of rotation of the driven shaft may be controlled as a function of a single trigger pulse, and in which novel interlocking means are provided, the construction shown in FIGS. 2 to 4 shows an arrangement with which also the duration of an effective drive may be controlled, whilst the advantages of small coupling forces and of a high degree of accuracy are maintained.

Three shafts 36, 37, 38 are mounted, by way of example, between two plates 35 and 35'. The shaft 36 carries a control disk 39 which is mounted thereon axially displaceably and freely rotatably, whilst a drive gear 40 in the form of a disk-shaped drive element is arranged axially and rotationally rigidly on the shaft. The control disk 39 is, therefore, associated with a disk shaped drive element or gear 40, mounted on the shaft 36. The drive gear 40 and the control disk 39 have mutually facing rings of claws 41, 42. The hub 76 of the control disk 39 has a groove-shaped circumferential recess 43 into which, for example, a fork 44 of a pivoting lever 45 is adapted to engage. The pivoting lever 45 is an angled lever, and pivotable at its apex about a pivot 46. The end of the leg of the angled lever 45, remote from the hub of the control disk 39, is connected with the armature, or with the extension of an armature 47 of an actuating magnet 48. A compression spring 49, mounted between the housing of the magnet 48 and the connected end of the angled lever 45 tends to displace the angled lever in such a way that a notch 50 of the hub makes engagement with a stop member 51 arranged on the plate 35. In FIG. 2, the carrier for the stop member 51 is shown at 74 and may form for example, a bearing of the shaft 36. The energization of the magnet 48 causes the rings of claws 41 and 42 to engage, and disengages simultaneously the profile notch 50 from the stop member 51. The profile notch 50 and the stop member 51 have step-shape shoulder 75, facing each other in the axial direction and extending in sectors over a part of the circumference relative to the shaft 36, e.g., over 90°. Thus, when following an actuating pulse the control disk 39 is connected to the drive element 40, the spring 47 returns the control disk after an angle of rotation of 90° back into the locked position.

The drive element 40 is driven indirectly by a drive gear 52 which is mounted on the shaft 38 of a drive motor 53 non-rotatably and axially non-displaceably. The drive element 40 and the drive gear 52 are both gears and are in continuous engagement.

The shaft 38 carries a driven disk 54 in the form of an axially displaceable driven gear or pinion; on its side facing the drive gear 52, the gear 54 has a ring of claws adapted to co-operate with a corresponding ring of claws 56 on the drive gear 52. The hub 57 of the driven gear is provided with a circumferential recess 58.

The shaft 37 carries a further disk or gear 59, mounted thereon axially non-displaceably, but rotatably. This gear meshes permanently with the control gear 39 and has a width such that this engagement is maintained also during the axial movement necessary for connecting and disconnecting the control gear. The hub 60 of the said further gear 59 has a ring 61 with axially offset circumferential sections, such as e.g. 62, 63, 64, into which engages a pivotable switching lever 65. This pivotable switching lever may be mounted, for example, on the plate 35 on a pin 66 with a hole 67 larger than the pin and is pushed by a spring 68 against an abutment 69 on the pin, thereby making it possible to provide a pivoting movement about the pin 66 in a plane containing this pin. The switching lever 65 has a fork 70 at its end facing the hub 60; pins 71, 72 facing each other are mounted on the two legs of the fork 70 and engage into the circumferential sections of the hub ring.

The other end of the lever 65 engages with the arms of a fork 73 into the circumferential groove 58 of the hub 57 of the driven gear 54.

Thus, when the rotation of the control gear 39 entrains the further rotation of the gear 59, the driven gear 54 is directly connected to the drive gear 52 as a function of the pivoting of the switching lever 65.

The rotationally rigid engagement between the control gear 39 and the said further gear 59 makes it, therefore, possible to provide only a connection or disconnection between the drive gear 52 of the motor 53 and the driven gear 54, by providing an offset of the circumferential sections 62 to 64 relative to the profiles or notches 50 of the control gear 39 co-operating with the stop member 51, by connecting the control disk 39 to the drive element 40. In consequence, successive pulses of the actuating magnet 48 can either switch a rotation of the driven gear 54, or stop such a rotation. Obviously, the driven gear 54 is associated with permanently meshing gears, not shown, and having such a width that the engagement is maintained even during axial displacements of the driven gear.

Since the said further or intermediate gear 59 is driven intermittently by every pulse in the same manner as the control gear 39, it is recommended to connect a counting unit to the control gear 39 or to the intermediate gear 59 for counting the operating pulses.

It should also be noted that the transmission conditions shown in FIGS. 2 to 4 are such that the speed of the said intermediate gear differs from that of the control gear 39. This makes it possible to select the point of engagement and to produce torque transmission. In order to obtain under these conditions a reproducible working rhythm of the control, the engaging elements between the profile notch 50 and the stop element 51 are dimensioned with regard to the arrangement of the sections 61 through 64 on the hub 60 in accordance with a transmission factor. It should be noted that sturdy, i.e., fairly wide interengaging profiles may be provided between the rings of claws for carrying out very fine control movements. Thus, the transmission does not relate only to the parts driven by the said further gear 59, but also to the control movements to be executed.

Furthermore, it should be pointed out that the control features of FIG. 1 can be used also in the construction shown in FIGS. 2, 3, 4 by using elements 15 and 16 on the control disk 81 instead of the parts 50 and 51. Furthermore, both constructions may be modified by providing, for example, a further disk 25 according to FIG. 1 in addition to the control disk 39 of FIGS. 2 and 3, utilizing the switching means described in conjunction with FIG. 1.

I claim:

1. A device for controlling one or several working processes or steps as a function of a trigger pulse, comprising frame means, a shaft mounted in said frame means, a disc-shaped drive element mounted on said shaft, a driven element for controlling through a certain angle of rotation, a motor device mounted on said frame means for continuously driving said shaft in rotation, a control disc mounted axially movably and rotatable on said shaft on which said disc-shaped drive element is mounted, rings of claws arranged on said control disc and on said drive element and facing each other in the axial direction of said control disc and drive element, means associated with said control disc for axially displacing it and selectively effecting engagement of said rings of claws, a profile on the control disc, a stop member arranged on said frame means and having a section adapted to coact with said profile of said control disc as a function of its axial displacement in one direction, and which disengages when the axially movable said control disc is moved for engagement with said disc-shaped drive element, and which locks said control disc rotationally in its position in which it is out of engagement with said disc-shaped drive element, wherein the actuation of the dog clutches formed by said rings of claws control the duration of the coupling of said driven member to said drive element, a second shaft, a further disc on said second shaft, said second shaft being mounted freely rotatable parallel to said first shaft in said frame means, said further disc engages with its circumference the circumference of said control disc, said further disc has at least one further profile, engaging means, a driven mechanism, said at least one further profile controls through said engaging means the duration of the connection of said driven mechanism with said drive disc wherein said dog clutches are adapted to be controlled by said further profile.

2. A device as set forth in claim 1, wherein a pivot located on said frame means, an actuating device, and said means associated with said control disc comprises a pivoting lever pivotally mounted about said pivot on said frame means and connected at one end to said control disc and at its other end to said actuating device, wherein an actuation of said actuating device produces a selective axial movement of said control disc for engaging with said disc-shaped drive element and for releasing this engagement.

3. A device as set forth in claim 2, in which the actuating device comprises an operating magnet and a spring (23, 47) acting on the pivoting lever and anchored at its other end in said frame means.

4. A device as set forth in claim 3, wherein said disc-shaped drive element is a drive disc non-rotatably and axially non-displaceably located on said shaft, said second shaft carries both said driven element and the non-rotatable and axially undisplaceable said further disc, a mating profile on said pivoting lever, and wherein said at least one further profile on said further disc is associated with said mating profile on said pivoting lever and acting as an engaging element.

5. A device as set forth in claim 4, in which the stop member (16) is mounted on the frame means adjustably about a circumference of the control disk (8).

6. A device as set forth in claim 4, in which the control disk has a hole-shaped profile (15) for the stop member in the form of a pin and the said further disk

(25) has a corresponding hole (33) for a pin (32) mounted on the pivoting lever (14), wherein a coincidence between the said profiles (15) and (33) and the pins occurs after a certain preselected number of revolutions of the control disk in accordance with the transmission ratio between the control disk (8) and the said further disk (25).

7. A device as set forth in claim 2, in which several stop members (16, 66) are arranged offset about the circumference of the said control disk.

8. A device as set forth in claim 1, in which the driven element (54) is mounted freely rotatably and axially displaceably on a third shaft (38) which also carries a rotational rigid gear (52) which meshes with the disk-shaped drive element (40) constructed as a gear, wherein the said further disk (50) engages both with the control disk (30) and with the driven element (54), wherein a switching lever (65) is arranged between a hub (57) of the disk-shaped driven element (54) and a hub (60) of the said further disk (59), which provides an indirect engagement between the disk-shaped drive element (40) and the driven disk (54), wherein the lever (65) is mounted on a pivot (66) located on the frame and displaceable in the plane of this pivot, wherein furthermore the said further profile associated with the said further disk (50) is a hub ring (61) with axially mutually offset circumferential sections (62, 63, 64), into which the said switching lever (65) is adapted to engage.

9. A device as set forth in claim 1, in which the profile (50) and the stop element (51) have axially facing step-like shoulders (66) which extend in the shape of sectors over a section of the periphery relative to the shaft (36).

10. A device as set forth in claim 9, in which the circumferential sections and the profile (50) of the control disk (39) coacting with the stop element (51) are offset relative to each other with their circumferential sections and the connection of the control disk (39) to the drive element (40, 52) causes a driven disk (54) to be connected to, or disconnected from, the drive element (40, 52), wherein the disk-shaped drive element is in driving engagement with a drive gear (52) mounted on the third shaft (38), and the driven disk (54) is mounted non-rotatably and axially displaceably on an extension of the said third shaft (38), and mutually facing second rings of claws (55, 56) on the drive gear (52) and on the driven disk (54) are adapted to be moved into and out of engagement by the pivotable siwtching lever (65).

11. A device as set forth in claim 10, wherein the control disk (8, 39), the said further disk (25, 59), the disk-shaped drive element (40) and the drive wheel (52) are gears and are in permanent meshing engagement.

* * * * *